United States Patent
Ono et al.

(10) Patent No.: US 11,090,754 B2
(45) Date of Patent: Aug. 17, 2021

(54) ARC WELDING CONTROL METHOD

(71) Applicant: DAIHEN Corporation, Osaka (JP)

(72) Inventors: Kohei Ono, Osaka (JP); Toshiaki Nakamata, Osaka (JP); Kento Takada, Osaka (JP)

(73) Assignee: DAIHEN Corporation, Osaka (JP)

( * ) Notice: Subject to any disclaimer, the term of this patent is extended or adjusted under 35 U.S.C. 154(b) by 329 days.

(21) Appl. No.: 16/251,367

(22) Filed: Jan. 18, 2019

(65) Prior Publication Data

US 2019/0232415 A1    Aug. 1, 2019

(30) Foreign Application Priority Data

Jan. 26, 2018 (JP) .............................. JP2018-011133
Jan. 26, 2018 (JP) .............................. JP2018-011679
Oct. 30, 2018 (JP) .............................. JP2018-203593

(51) Int. Cl.
| | |
|---|---|
| *B23K 9/12* | (2006.01) |
| *B23K 9/073* | (2006.01) |
| *B23K 9/09* | (2006.01) |
| *B23K 9/095* | (2006.01) |
| *B23K 9/10* | (2006.01) |

(52) U.S. Cl.
CPC .............. *B23K 9/125* (2013.01); *B23K 9/073* (2013.01); *B23K 9/09* (2013.01); *B23K 9/091* (2013.01); *B23K 9/095* (2013.01); *B23K 9/0953* (2013.01); *B23K 9/1006* (2013.01)

(58) Field of Classification Search
CPC ......... B23K 9/073; B23K 9/095; B23K 9/125
See application file for complete search history.

(56) References Cited

U.S. PATENT DOCUMENTS

| | | | |
|---|---|---|---|
| 8,513,568 B2 * | 8/2013 | Kawamoto | .......... B23K 9/0735 |
| | | | 219/130.21 |
| 2009/0302014 A1 | 12/2009 | Aberg | |
| 2014/0360997 A1 | 12/2014 | Murakami et al. | |
| 2017/0252850 A1 | 9/2017 | Ide | |

FOREIGN PATENT DOCUMENTS

| | | | | |
|---|---|---|---|---|
| EP | 2 436 471 A2 | 4/2012 | | |
| JP | 2012-632 A | 1/2012 | | |
| JP | 2014184452 A | * 10/2014 | ............. | B23K 9/095 |
| JP | 2014-237155 A | 12/2014 | | |
| WO | 2016039113 A1 | 3/2016 | | |

OTHER PUBLICATIONS

Translation of JP-2014184452-A (Year: 2014).*
Search Report received in the corresponding European Patent application, dated Aug. 9, 2019 (5 pages).

* cited by examiner

*Primary Examiner* — Erin E McGrath
(74) *Attorney, Agent, or Firm* — Hamre, Schumann, Mueller & Larson, P.C.

(57) ABSTRACT

A method is provided for controlling arc welding including forward and reverse feeding periods alternately switched. By the method, a set of a short circuit period and an arc period is repeated, and the arc welding is controlled such that the reverse feeding period shifts to the forward feeding period when an arc occurs during the reverse feeding period, and that the forward feeding period shifts to the reverse feeding period when a short circuit occurs between the welding wire and the object during the forward feeding period. The reverse feeding period includes a reverse feeding deceleration period having a time length that is adjusted in accordance with the time length of the short circuit period.

4 Claims, 3 Drawing Sheets

ARC WELDING CONTROL METHOD

FIELD

The present disclosure relates to an arc welding control method whereby welding is performed by alternately switching between forward and reverse wire feeding periods.

BACKGROUND

In typical consumable electrode arc welding, welding is performed by feeding a welding wire which is a consumable electrode at a constant speed, and generating an arc between the welding wire and a base material. In consumable electrode arc welding, the welding wire and the base material often undergo a short circuit period and an arc period alternately.

In order to improve weld quality, a forward-reverse feed arc welding method has been proposed, with which forward and reverse feeding of the welding wire is repeatedly conducted I welding. WO 2016/039113 (FIG. 7), for example, discloses such a forward-reverse feed arc welding method with which a short circuit period and an arc period are repeated. By this conventional method, if an arc is generated during a reverse feeding period, the control shifts to a forward feeding period, and if a short circuit occurs during a forward feeding period, the control shifts to a reverse feeding period.

As known in the art, the time length of the short circuit period varies due to disturbances such as irregular movement of the molten pool or the molten state of the welding wire. With forward-reverse feed arc welding, there is a problem in that the welding state tends to be affected by variation of the short circuit period, compared with normal arc welding configured to perform forward feed only.

SUMMARY

In view of the above, the present disclosure presents an arc welding control method for ensuring stable welding state in forward-reverse feed arc welding even when the short circuit period varies.

According to an aspect of the present disclosure, there is provided a method of controlling arc welding with a forward feeding period and a reverse feeding period that are alternately switched, where a welding wire is fed toward an object to be welded during the forward feeding period, while being fed away from the object during the reverse feeding period. The method may be configured to: repeat a set of a short circuit period and an arc period, where the welding wire and the object are short-circuited during the short circuit period, and an arc is generated between the welding wire and the object during the arc period; control the arc welding such that the reverse feeding period shifts to the forward feeding period when an arc occurs during the reverse feeding period; and control the arc welding such that the forward feeding period shifts to the reverse feeding period when a short circuit occurs between the welding wire and the object during the forward feeding period. In an embodiment, the reverse feeding period may include a reverse feeding deceleration period having a time length that is adjusted in accordance with the time length of the short circuit period.

Preferably, the time length of the reverse feeding deceleration period may be adjusted such that the time length of the reverse feeding period is equal to a predetermined reverse period value.

Preferably, the method may further be configured to increase a welding current upon elapsing of a delay time period which starts at the time that the arc period begins. The delay time period may be controlled to vary in accordance with the time length of the reverse feeding deceleration period.

Preferably, the forward feeding period may include a forward feeding acceleration period having a time length that is adjusted in accordance with a time length of the arc period.

Preferably, the time length of the forward feeding acceleration period may be adjusted such that a time length of the forward feeding period is equal to a predetermined forward period value.

According to the above configurations, it is possible to stabilize the state of welding even when the short circuit period varies in forward-reverse feed arc welding.

EMBODIMENTS

Embodiments of the present disclosure will be described below with reference to the drawings.

According to a first embodiment, a reverse feeding deceleration period and a short circuit period may be defined, and the time length of the reverse feeding deceleration period may be controlled (e.g., suitably adjusted to a desired value) depending on the time length of the short circuit period.

Figure 1:
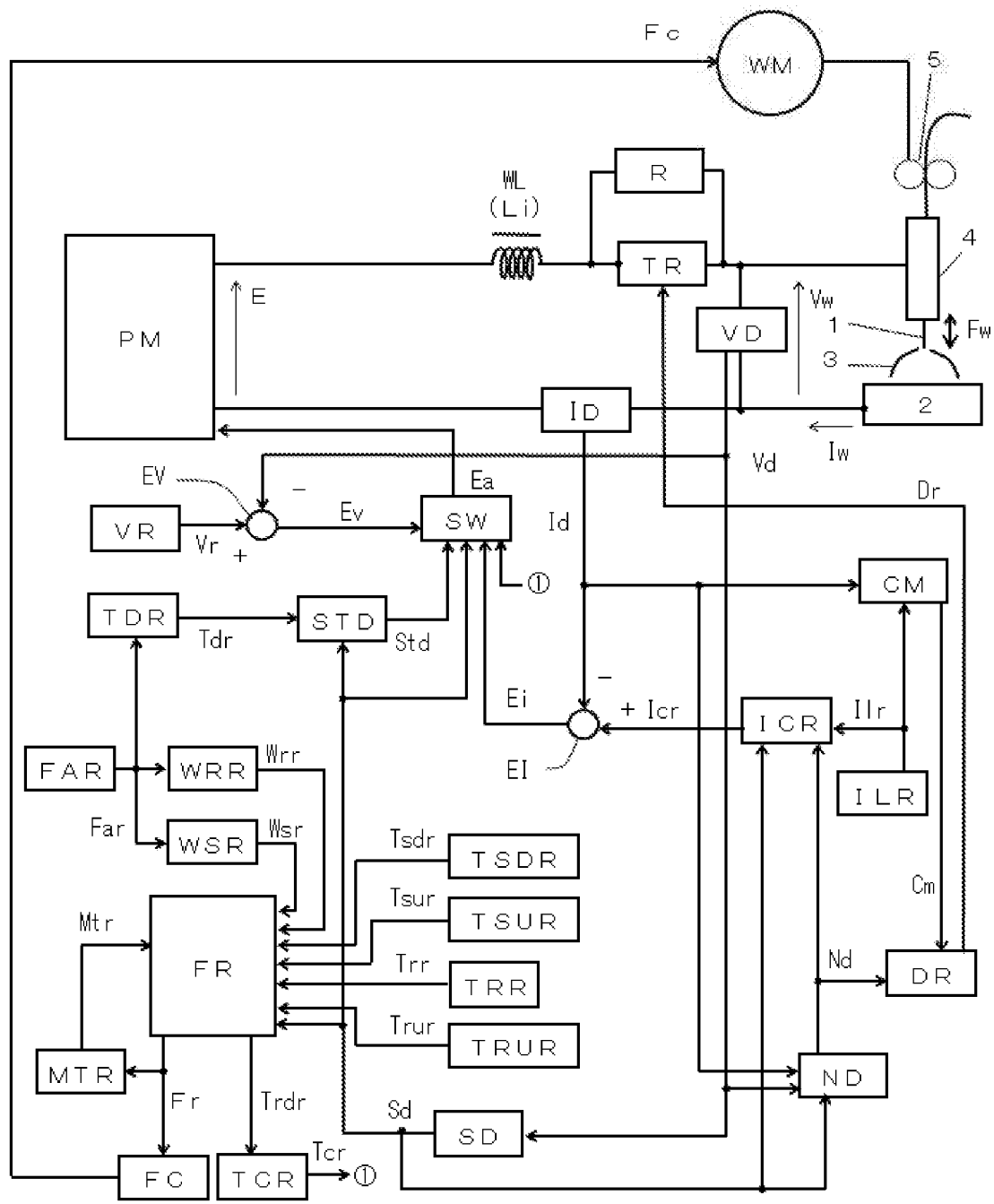
FIG. 1 is a block diagram of a welding power source for implementing an arc welding control method according to a first embodiment.

FIG. 1 is a block diagram of a welding power source for implementing an arc welding control method according to the first embodiment. The blocks depicted in FIG. 1 will be described below.

A power main circuit PM may be connected to a commercial power source and receive 3-phase voltage (200 V for example) as an input. In the circuit PM, output control is performed by inverter control, for example, in accordance with error amplification signals Ea, so that required voltage E is outputted. As well known in the art, the power main circuit PM may be provided with a primary rectifier (that rectifies the voltage supplied from the commercial power source), a smoothing capacitor (that smoothes the rectified direct current), an inverter circuit (that is driven by error amplification signals Ea and converts the smoothed direct current into high frequency alternating current), a high frequency transformer (that reduces the high frequency alternating current to a voltage suitable for welding), and a secondary rectifier (that rectifies the reduced high frequency alternating current into direct current).

The power main circuit PM may have two or more outputs (such as output terminals), and one of them is connected to a reactor WL, which smoothes the output voltage E. The inductance value of the reactor WL is 100 µH, for example.

A wire feeding motor WM receives feeding control signals Fc as an input and is driven to feed a welding wire 1 at feeding speed Fw by repeating forward feeding and reverse feeding alternately. For the feeding motor WM, use may be made of a motor having good transient responsiveness. In the illustrated example, the feeding motor WM is depicted as being separated from other components, but the present disclosure is not limited to this. For instance, the feeding motor WM may be disposed close to the front end of the welding torch 4 so as to improve the change rate (acceleration) of feeding speed Fw of the wire 1 and also to enable quick reversal of the feeding direction of the wire 1. The number of such a feeding motor to be used may be more than one. For instance, two feeding motors WM may be used for providing a feeding system configured to implement a conventionally known push-pull method.

The feeding motor WM may be physically connected to at least one feeding roller 5 (in the illustrated example, two feeding rollers 5 are provided to pinch the welding wire 1). Upon rotation of the motor WM, the welding wire 1 may be fed forward or backward through the welding torch 4. An arc 3 is generated between the tip of the welding wire 1 (that projects from the torch 4) and a base material (an target object to be welded) 2. The welding torch 4 is internally provided with a power supply chip arranged to come into direct contact with the welding wire 1 being fed through the torch 4. In welding, a welding voltage Vw is applied between the power supply chip of the welding torch 4 and the base material 2 to cause welding current Iw to flow.

A current detection circuit ID, provided to detect the welding current Iw, outputs a current detection signal Id upon detection of the current. A voltage detector circuit VD, provided to detect the welding voltage Vw, outputs a voltage detection signal Vd upon detection of the voltage. Based on the detected welding voltage Vw (and hence, on the voltage detection signal Vd corresponding to the voltage Vw), it is possible to determine if the welding condition is being in a "short circuit period" or in an "arc period". To enable the determination, in the illustrated example, a short circuit determination circuit SD is provided, which is connected to the voltage detector circuit VD and configured to receive the voltage detection signal Vd as an input. The short circuit determination circuit SD is also configured to output a (relatively) high or low short circuit determination signal Sd depending on the values of the inputted voltage detection signal Vd. Specifically, the short circuit determination circuit SD may output a high level of signal (indicating that the welding condition is in a short circuit period) when the value of the voltage detection signal Vd is lower than a predetermined threshold ("short circuit determination value") such as 10 V, for example, while also outputting a low level of signal (indicating that the welding condition is in an arc period) when the value of the voltage detection signal Vd is equal to or higher than the above-mentioned threshold.

A voltage setting circuit VR is provided to output a predetermined voltage setting signal Vr to a voltage error amplification circuit EV, which is schematically indicated by a circle in FIG. 1.

The voltage error amplification circuit EV receives the voltage setting signal Vr and the voltage detection signal Vd as inputs, and amplifies the error between the voltage setting signal Vr (+) and the voltage detection signal Vd (−) to output a voltage error amplification signal Ev.

An average feeding speed setting circuit FAR is provided to output a predetermined average feeding speed setting signal Far.

A forward feeding acceleration period setting circuit TSUR is provided to output a predetermined forward feeding acceleration period setting signal Tsur.

A forward feeding deceleration period setting circuit TSDR is provided to output a predetermined forward feeding deceleration period setting signal Tsdr.

A reverse feeding acceleration period setting circuit TRUR is provided to output a predetermined reverse feeding acceleration period setting signal Trur.

A forward feeding peak value setting circuit WSR is provided to receive the average feeding speed setting signal Far as an input and output a predetermined forward feeding peak value setting signal Wsr in correspondence with the average feeding speed setting signal Far. The forward feeding peak value setting signal Wsr may be calculated in advance by an experiment so that the average of feeding speeds Fw becomes equal to the value of the average feeding speed setting signal Far. The calculated forward feeding peak value setting signals Wsr (corresponding to the relevant average feeding speed setting signals Far) are stored in the forward feeding peak value setting circuit WSR.

A reverse feeding peak value setting circuit WRR is provided to receive the average feeding speed setting signal Far as an input and outputs a predetermined reverse feeding peak value setting signal Wrr in correspondence with the average feeding speed setting signal Far. The reverse feeding peak value setting signal Wrr may be calculated in advance by an experiment so that the average of feeding speeds Fw becomes equal to the value of the average feeding speed setting signal Far. The calculated reverse feeding peak value setting signals Wrr (corresponding to the relevant average feeding speed setting signals Far) are stored in the reverse feeding peak value setting circuit WRR.

A reverse feeding period setting circuit TRR is provided to output a predetermined reverse feeding period setting signal Trr.

A reverse feeding period measurement circuit MTR is provided to receive a feeding speed setting signal Fr as an input, and measures the length of an elapsed time that starts from the time at which the feeding speed setting signal Fr changes from positive to negative (in other words, from the time of start of a reverse feeding period). Then, the reverse feeding period measurement circuit MTR outputs a reverse feeding period measurement signal Mtr to a feeding speed setting circuit FR.

The feeding speed setting circuit FR receives, as inputs, the forward feeding acceleration period setting signal Tsur, the forward feeding deceleration period setting signal Tsdr, the reverse feeding acceleration period setting signal Trur, the forward feeding peak value setting signal Wsr, the reverse feeding peak value setting signal Wrr, the short circuit determination signal Sd, the reverse feeding period setting signal Trr and the reverse feeding period measurement signal Mtr. Further, the feeding speed setting circuit FR outputs a feeding speed pattern (to be generated by the following processing 1 to 7) as a feeding speed setting signal Fr, while also outputting a calculated reverse feeding deceleration period setting signal Trdr. When the feeding speed setting signal Fr is positive, the welding condition is in a forward feeding period, and when negative, the welding condition is in a reverse feeding period.

1) During a forward feeding acceleration period Tsu, which is determined by the forward feeding acceleration period setting signal Tsur, the feeding speed setting circuit FR outputs a feeding speed setting signal Fr that accelerates linearly from 0 to a forward feeding peak value Wsp having a positive value determined by the forward feeding peak value setting signal Wsr.

2) Then, during a forward feeding peak period Tsp, the feeding speed setting circuit FR outputs a feeding speed setting signal Fr for maintaining the forward feeding peak value Wsp.

3) When the short circuit determination signal Sd changes from Low (arc period) to High (short circuit period), the control shifts to a forward feeding deceleration period Tsd determined by the forward feeding deceleration period setting signal Tsdr, and the feeding speed setting circuit FR outputs a feeding speed setting signal Fr that decelerates linearly from the forward feeding peak value Wsp to 0.

4) Then, during a reverse feeding acceleration period Tru determined by the reverse feeding acceleration period setting signal Trur, the feeding speed setting circuit FR output a feeding speed setting signal Fr that accelerates linearly from 0 to a reverse feeding peak value Wrp having a negative value that is determined by the reverse feeding peak value setting signal Wrr.

5) Then, during a reverse feeding peak period Trp, the feeding speed setting circuit FR outputs a feeding speed setting signal Fr for maintaining the reverse feeding peak value Wrp.

6) At the time that the short circuit determination signal Sd changes from High (short circuit period) to Low (arc period), the feeding speed setting circuit FR calculates a reverse feeding deceleration period setting signal Trdr by subtracting the value of the reverse feeding period measurement signal Mtr from the value of the reverse feeding period setting signal Trr, and then outputs the calculated reverse feeding deceleration period setting signal Trdr. During a reverse feeding deceleration period Trd determined by the reverse feeding deceleration period setting signal Trdr, the feeding speed setting circuit FR then outputs a feeding speed setting signal Fr that decelerates linearly from the reverse feeding peak value Wrp to 0. As a result, a reverse feeding period Tr will have a length corresponding to (i.e., equal to) the value of the reverse feeding period setting signal Trr even when the short circuit period varies.

7) By repeating the above process 1 to 6, a feeding speed setting signal Fr is generated, which has a feeding pattern that alternates between a trapezoid on the positive side and a trapezoid on the negative side.

A feeding control circuit FC is provided to receive the feeding speed setting signal Fr as an input, and outputs a feeding control signal Fc to the feeding motor WM. As a result, the welding wire 1 will be fed at a feeding speed Fw corresponding to the value of the feeding speed setting signal Fr.

A current decreasing resistor R is inserted between the reactor WL and the welding torch 4. The resistance of the current decreasing resistor R may be about 0.5 to 3Ω, which is equal to or greater than ten times the short circuit load (about 0.01 to 0.03Ω). When the current decreasing resistor R is inserted into the energized path, the energy stored in the reactor WL and the reactor of an external cable will be discharged quickly.

A transistor TR is connected in parallel to the current decreasing resistor R, and is controlled to be turned ON/OFF in accordance with a drive signal Dr.

A constriction detection circuit ND is provided to receive the short circuit determination signal Sd, the voltage detection signal Vd and the current detection signal Id as inputs, and outputs a constriction detection signal Nd that becomes High or Low depending on the constriction forming condition. Specifically, the constriction detection circuit ND determines that the state of a constriction to be formed reaches a predetermined reference state when the rising voltage of the voltage detection signal Vd reaches a predetermined threshold (reference voltage) while the short circuit determination signal Sd is being High (short circuit period). Upon this determination, the constriction detection circuit ND outputs a constriction detection signal Nd of High level. On the other hand, the constriction detection circuit ND outputs a constriction detection signal Nd of Low level at the time that the short circuit determination signal Sd changes to Low level (arc period). Alternatively, a configuration may be adopted in which the constriction detection signal Nd is changed to High level at the time that the differential value of the voltage detection signal Vd during the short circuit period reaches a predetermined threshold value. Further, another configuration may be adopted in which the resistance value of a globule is calculated based on the voltage detection signal Vd and the current detection signal Id (e.g., by dividing the value of the voltage detection signal Vd by the value of the current detection signal Id), and the constriction detection signal Nd may be changed to High at the time that the differential value of the calculated resistance reaches a predetermined threshold (reference value).

A low level current setting circuit ILR outputs a predetermined low level current setting signal Ilr. A current comparison circuit CM is provided to receive the low level current setting signal Ilr and the current detection signal Id as inputs, and outputs a current comparison signal Cm of High level when Id<Ilr and of Low level when Id≥Ilr.

A drive circuit DR is provided to receive the current comparison signal Cm and the constriction detection signal Nd as inputs, and outputs a drive signal Dr to the base terminal of the transistor TR. The drive signal Dr may change to Low when the constriction detection signal Nd changes to High, and then change to High when the current comparison signal Cm changes to High. Thus, when a constriction is detected, the drive signal Dr changes to Low, and the transistor TR is turned off, while the current decreasing resistor R is inserted in the energized path. Accordingly, the welding current Iw energizing the short circuit load rapidly decreases. Then, when the decreasing welding current Iw reaches down the value of the low level current setting signal Ilr, the drive signal Dr changes to High, and the transistor TR is turned on. Accordingly, the current decreasing resistor R is short-circuited and the system returns to the normal state.

A current control setting circuit ICR is provided to receive the short circuit determination signal Sd, the low level current setting signal Ilr and the constriction detection signal Nd as inputs, and performs the following processing to output a current control setting signal Icr.

1) When the short circuit determination signal Sd is at Low level (arc period), the current control setting circuit ICR outputs a current control setting signal Icr which is equal to the low level current setting signal Ilr.

2) When the short circuit determination signal Sd changes to High level (short circuit period), the current control setting circuit ICR outputs a current control setting signal Icr which has a predetermined initial current setting value during a predetermined initial period and thereafter rises to a predetermined short circuit peak setting value at a predetermined short circuit inclination and maintains this peak setting value.

3) Thereafter, when the constriction detection signal Nd changes to High level, the current control setting circuit ICR outputs a current control setting signal Icr which is equal to the low level current setting signal Ilr.

A current error amplification circuit EI is provided to receive the current control setting signal Icr and the current detection signal Id as inputs, and amplifies the error between the current control setting signal Icr (+) and the current detection signal Id (−) to output a current error amplification signal Ei.

A current falling time period setting circuit TDR is provided to calculate a current falling time period Td by a predetermined current falling time enumeration function that takes the average feeding speed setting signal Far as an input, and outputs a current falling time period setting signal Tdr. For instance, the current falling time enumeration function may be: Td (ms)=0.5×[Far]+4, where [Far] may be in a range of 0 to 10 m/min. In this example, the current falling time period Td is in a range of 4 to 9 milliseconds. An form of the current falling time enumeration function to be used may be determined experimentally in light of the diameter and material of the welding wire, for example, so that an appropriate value is obtained as the current falling time period Td.

A small current period circuit STD is provided to receive the short circuit determination signal Sd and the current falling time period setting signal Tdr as inputs, and outputs a small current period signal Std. The small current period signal Std becomes High at the time that the current falling time period Td (determined by the current falling time period setting signal Tdr) has elapsed from the start time at which the short circuit determination signal Sd changes to Low level (arc period). Thereafter, the small current period signal Std becomes Low at the time that the short circuit determination signal Sd becomes High (short circuit period).

A delay time period setting circuit TCR is provided to receive the reverse feeding deceleration period setting signal Trdr as an input, and multiplies the value of the received signal by a predetermined coefficient to output a delay time period setting signal Tcr. The coefficient to be selected may be 0.8, for example. In an example, the value of the delay time period setting signal Tcr varies in proportion to the value of the reverse feeding deceleration period setting signal Trdr.

A power source characteristic switching circuit SW is provided to receive the current error amplification signal Ei, the voltage error amplification signal Ev, the short circuit determination signal Sd, the delay time period setting signal Tcr and the small current period signal Std as inputs, and performs the following processing to output an error amplification signal Ea.

1) The power source characteristic switching circuit SW outputs the received current error amplification signal Ei as the error amplification signal Ea during a period starting from the time that the short circuit determination signal Sd changes to High (short circuit period) till the time that the delay time period Tc (determined by the delay time period setting signal Tcr) has elapsed, where the period Tc begins at the time that the short circuit determination signal Sd changes to Low (arc period).

2) Then, the power source characteristic switching circuit SW outputs the received voltage error amplification signal Ev as the error amplification signal Ea during the arc period.

3) Then, if the small current period signal Std becomes High and maintains the same high level during the arc period, the power source characteristic switching circuit SW outputs the received current error amplification signal Ei as the error amplification signal Ea.

With the configurations described so far, the welding power source can exhibit characteristics of constant-current power source during the short circuit period, the delay period and the small current period, while being able to exhibit characteristics of constant-voltage power source during the remaining period, i.e., the arc period.

Figure 2:
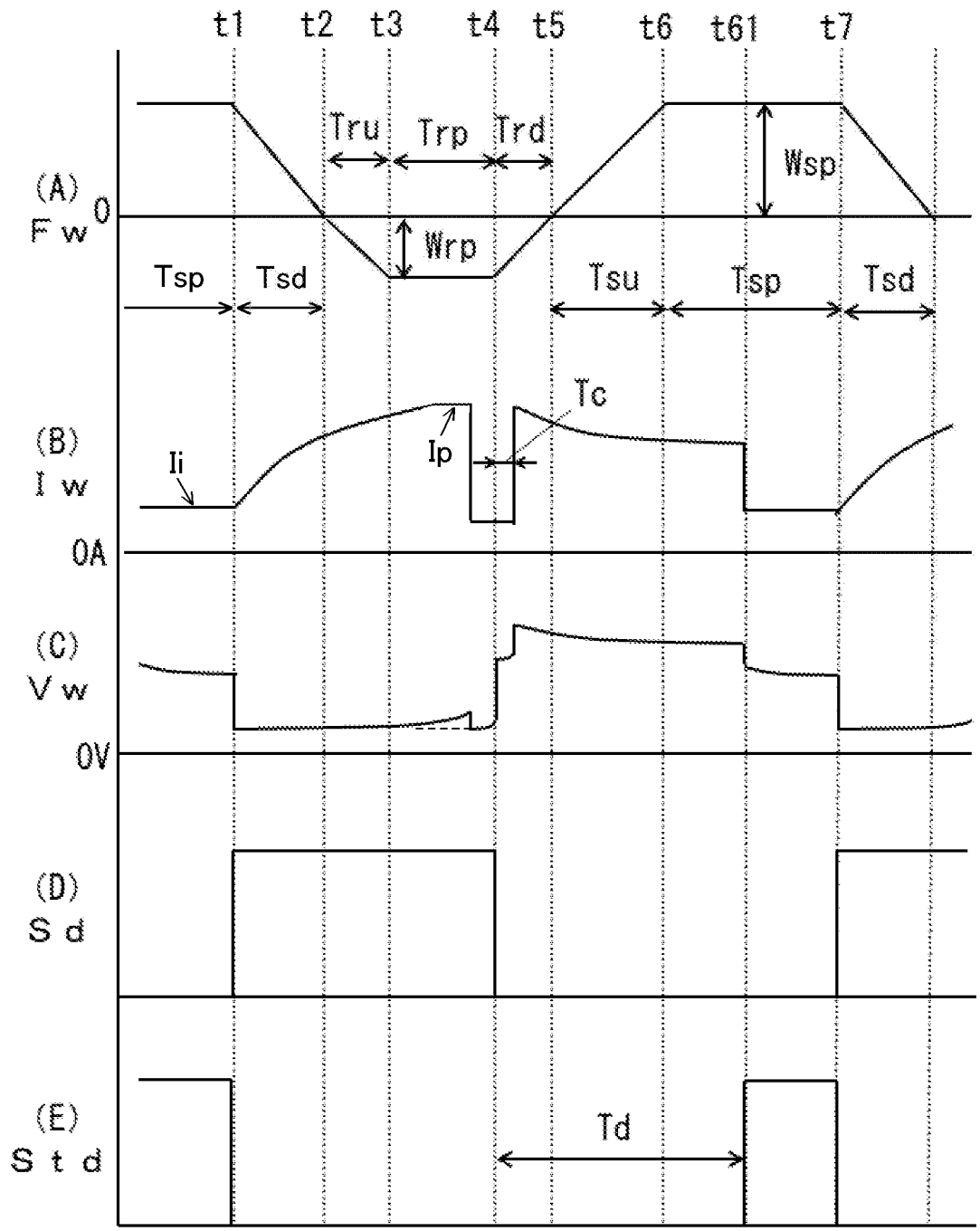
FIG. 2 is a timing chart of signals of the welding power source in FIG. 1.

FIG. 2 is a timing chart of signals of the welding power source in FIG. 1 for illustrating the arc welding control method according to the first embodiment. In FIG. 2, (A) shows the variation of the feeding speed Fw with time, (B) shows the variation of the welding current Iw with time, (C) shows the variation of the welding voltage Vw with time, (D) shows the variation of the short circuit determination signal Sd with time, and (E) shows the variation of the small current period signal Std with time.

The feeding speed Fw shown in (A) of FIG. 2 is controlled by the value of the feeding speed setting signal Fr outputted from the feeding speed setting circuit FR. As illustrated, the feeding speed Fw may undergo different kinds of variation (including zero variation, i.e., being constant) depending on the respective periods, that is, the forward feeding acceleration period Tsu determined by the forward feeding acceleration period setting signal Tsur, the forward feeding peak period Tsp continuing until a short circuit occurs, the forward feeding deceleration period Tsd determined by the forward feeding deceleration period setting signal Tsdr, the reverse feeding acceleration period Tru determined by the reverse feeding acceleration period setting signal Trur, the reverse feeding peak period Trp continuing until an arc is generated, and the reverse feeding deceleration period Trd that is automatically adjusted such that the reverse feeding period Tr corresponds to the value of the reverse feeding period setting signal Trr. For the forward feeding peak period Tsp, a forward feeding peak value Wsp is determined by the forward feeding peak value setting signal Wsr so as to be an appropriate value corresponding to the average feeding speed setting signal Far. For the reverse feeding peak period Trp, a reverse feeding peak value Wrp is determined by the reverse feeding peak value setting signal Wrr so as to be an appropriate value corresponding to the average feeding speed setting signal Far. As a result, the feeding speed setting signal Fr takes a feeding pattern that alternates between positive and negative substantially trapezoidal waveforms with time.

In FIG. 2, the period from t1 to t4 corresponds to the short circuit period. Specifically, when a short circuit occurs in the forward feeding peak period Tsp (see t1), the welding voltage Vw rapidly decreases to a voltage ("short circuit voltage") of several volts, as shown in (C) of FIG. 2. At the same time, as shown in (D), the short circuit determination signal Sd changes to High level (indicating a short circuit period). Thus, the welding shifts to the forward feeding deceleration period Tsd from t1 to t2, in which the feeding speed Fw reduces from the forward feeding peak value Wsp to 0, as shown in (A). The forward feeding deceleration period Tsd may have a length of 1 ms, for example.

As shown in (A), the reverse feeding acceleration period Tru starts at t2 and ends at t3, in which the feeding speed Fw increases from 0 to the reverse feeding peak value Wrp. The reverse feeding acceleration period Tru (t2-t3) corresponds to a part of the short circuit period (t1-t4). The reverse feeding acceleration period Tru may have a length of 1 ms, for example.

Upon ending of the reverse feeding acceleration period Tru at t3, the welding shifts to the reverse feeding peak period Trp, in which the feeding speed Fw takes the reverse feeding peak value Wrp shown in (A). The reverse feeding peak period Trp continues until an arc is generated (in other words, the short circuit period ends) at t4. The length of the reverse feeding peak period Trp may be, without limitation, 2 ms. The reverse feeding peak value Wrp, which can vary depending on the average feeding speed setting signal Far, is set to a value in a range of −30 to −50 m/min, for example.

As shown in (B), the welding current Iw takes a predetermined initial current value Ii (e.g., 40A) for a predetermined initial period (e.g., 0.5 ms) during the short circuit period (t1-t4). Then, the welding current Iw rises at a predetermined rate(s) ("short circuit inclination" which may be 180 A/ms) until it reaches a predetermined short circuit peak value Ip (e.g., 400 A) which is maintained for a certain length of time.

As shown in (C), the welding voltage Vw beings to rise at the time that the welding current Iw is about to reach the short circuit peak value Ip. This is because a constriction begins to form in the globule at the tip of the welding wire 1 due to the reverse feeding of the welding wire 1 and pinch force resulting from the welding current Iw.

When the rising welding voltage Vw reaches a predetermined reference value, it is determined that the constriction forming has entered a reference state, and the constriction detection signal Nd changes to High level.

In response to the above change of the constriction detection signal Nd, the drive signal Dr becomes Low, thereby causing the transistor TR to be turned off and thus the current decreasing resistor R to be inserted in the energized path. At the same time, the current control setting signal Icr decreases to the value of the low level current setting signal Ilr. Thus, as shown in (B), the welding current Iw decreases sharply from the short circuit peak value Ip to a low level current value (e.g., 50 A). As a result, the drive signal Dr returns to High level, causing the transistor TR to be turned on so as to short-circuit the current decreasing resistor R. At this stage, the current control setting signal Icr remains at the low level current setting signal Ilr, and thus the welding current Iw, as shown in (B), maintains the low level current value from occurrence of the arc until the delay time period Tc (which is determined by the delay time period setting signal Tcr) has elapsed. In such configurations, the transistor TR remains turned off only for the period from the time that the constriction detection signal Nd changes to High until the time that the welding current Iw decreases to the low level current value. As shown in (C), the welding voltage Vw (rising after t3) temporarily drops and then sharply rises due to the decrease of the welding current Iw.

Following the short circuit period explained above, an arc period (t4-t7) begins. Specifically, at t4, the welding voltage Vw sharply increases to an "arc voltage" value of several tens of volts, as shown in (C), as the formation of the constriction has progressed and an arc is generated due to the above-mentioned pinch force and the reverse feeding of the welding wire. Upon the increase of the welding voltage Vw, the short circuit determination signal Sd changes to Low level (arc period), as shown in (D). The reverse feeding period measurement circuit MTR in FIG. 1 outputs the reverse feeding period measurement signal Mtr indicating the elapsed time starting from t2 (at which the feeding speed Fw changes from positive to negative. In other words, the reverse feeding period measurement signal Mtr indicates the length of time of the reverse feeding period. Taking the reverse feeding period measurement signal Mtr at t4 (simply noted as "Mtr4") for example, the reverse feeding deceleration period Trd (t4-t5) is calculated at t4 by subtracting the value of Mtr4 from the value of the reverse feeding period setting signal Trr. Then, the welding shifts to the calculated reverse feeding deceleration period Trd of t4 to t5, for which, as shown in (A), the feeding speed Fw decreases from the reverse feeding peak value Wrp to 0. In the illustrated example, the reverse feeding deceleration period Trd may be in a range of 0.5 to 2 ms.

When the reverse feeding deceleration period Trd ends at t5, the welding shifts to the forward feeding acceleration period Tsu (t5-t6). During the forward feeding acceleration period Tsu, the feeding speed Fw increases from 0 to the forward feeding peak value Wsp, as shown in (A). The arc period is continuing during this period. The forward feeding acceleration period Tsu may be 1 ms, for example.

When the forward feeding acceleration period Tsu ends at t6, the welding shifts to the forward feeding peak period Tsp, and the feeding speed Fw takes the forward feeding peak value Wsp, as shown in (A). This period is also within the arc period. The forward feeding peak period Tsp continues until a short circuit occurs at t7. Accordingly, the period of t4 to t7 is the arc period. When the short circuit occurs, the welding returns to the same stage at the time of t1. The forward feeding peak period Tsp may be, without limitation, 4 ms, for example. The forward feeding peak value Wsp, which depends on the average feeding speed setting signal Far, may be in a range of 30 to 50 m/min.

When the arc is generated at t4, the welding voltage Vw sharply increases to an arc voltage value of several tens of volts, as shown in (C). On the other hand, as shown in (B), the welding current Iw continues to be at the low level current value during the delay time period Tc determined by the delay time period setting signal Tcr. The delay time period Tc is in a proportional relationship with the reverse feeding deceleration period Trd, and is automatically set to an appropriate value when the reverse feeding deceleration period Trd is varied. This helps to suppress melting of the welding wire 1 by reducing the current value during the reverse feeding deceleration period Trd. By adopting such a configuration, the arc length at the time that the reverse feeding deceleration period Trd ends can be precisely controlled by the feeding speed Fw of reverse feeding. As a result, the arc generation can be stabilized and the arc period can be adjusted accurately.

Then, the welding current Iw increases to a high current value. During the arc period in which this high current value is reached, the welding power source is subjected to feedback control performed by the voltage error amplification signal Ev, and thus has constant-voltage characteristics.

After the arc is generated at t4 and the current falling time period Td (determined by the current falling time period setting signal Tdr) has elapsed, the small current period signal Std changes to High level at t61, as shown in (E). In response, the welding power source is switched from constant-voltage characteristics to constant-current characteristics. Thus, as shown in (B), the welding current Iw drops to a low level current value, which is maintained until t7 at which another short circuit occurs. Similarly, the welding voltage Vw drops, as shown in (C). The small current period signal Std returns to Low level when the short circuit occurs at t7.

The current falling time period Td is determined in accordance with the average feeding speed setting signal Far. Preferably, the current falling time period Td is set such that the timing at which the welding current Iw becomes a small current value (i.e., t61 at which the small current period signal Std becomes High) comes about 0.5 to 1 ms before t7 at which the short circuit occurs. As a result, time t61 will be during the forward feeding peak Tsp. It should be noted that when the current falling time period Td is too short, the period t61 to t7 of the small current value becomes longer, and the state of the arc becomes unstable. When the current falling time period Td is too long, the welding current Iw may fail to decrease to the small current value before the short circuit occurs, thereby unduly increasing spatter. Hence, it is important for the current falling time period Td to be set to an appropriate value in light of the welding conditions.

Hereinafter, advantages of the abovementioned first embodiment will be described. According to the first embodiment, the time length of the reverse feeding deceleration period Trd is adjusted in accordance with the time length of the short circuit period. This configuration is advantageous in the following respects.

(1) When the short circuit period becomes longer due to a disturbance, for example, control is performed to make the reverse feeding deceleration period Trd shorter. During the reverse feeding deceleration period, the welding wire is being pulled up (i.e., fed backward) with an arc being generated. Since the shortened reverse feeding deceleration period Trd reduces the pulled length (or distance) of the welding wire, the welding will shift to the forward feeding period while the arc length is relatively short. Hence, the next short circuit will occur earlier than otherwise and the arc period will be shorter. Accordingly, the respective cycles of short circuit/arc periods repeatedly conducted can be stabilized (e.g., equalized), and the resulting welding conditions are prevented from suffering undesired quality variation, for example.

(2) When the short circuit period becomes shorter due to a disturbance, on the other hand, control is performed to make the reverse feeding deceleration period Trd longer. As noted above, during the reverse feeding deceleration period, the welding wire is being pulled up with an arc being generated. Thus, the longer reverse feeding deceleration period Trd makes the arc length greater before the welding shifts to the forward feeding period. Accordingly, the next short circuit will occur much later than otherwise (in other words, the arc period will be longer). Accordingly, the respective cycles of short circuit/arc periods repeatedly conducted can be stabilized (e.g., equalized), and the resulting welding conditions are prevented from suffering undesired quality variation, for example.

Furthermore, in the first embodiment, control of the time length of the reverse feeding deceleration period Trd may be performed such that the reverse feeding period (t2-t5) will be a predetermined value (e.g., constant value). In this case, the reverse feeding deceleration period Trd can also be shorter when the short circuit period (t1-t4) becomes longer and longer when the short circuit period (t1-t4) becomes shorter. By adopting such configurations, control of the reverse feeding deceleration period Trd is simplified (while enjoying the above-noted advantage), and the stability of the control system improves.

Furthermore, in the first embodiment, the welding current is increased after the welding shifts to the arc period and a delay time period has elapsed, where the delay time period is suitably adjusted in accordance with the time length of the reverse feeding deceleration period Trd. By adopting such configurations, the delay time period can be automatically varied to an appropriate value as the reverse feeding deceleration period Trd varies. In addition, by reducing the current value for (at least a part of) the reverse feeding deceleration period Trd, undesired melting of the welding wire can be suppressed, and the arc length can be controlled with precision. Accordingly, arc generation can be stabilized, and the arc period can be adjusted accurately.

Figure 3:
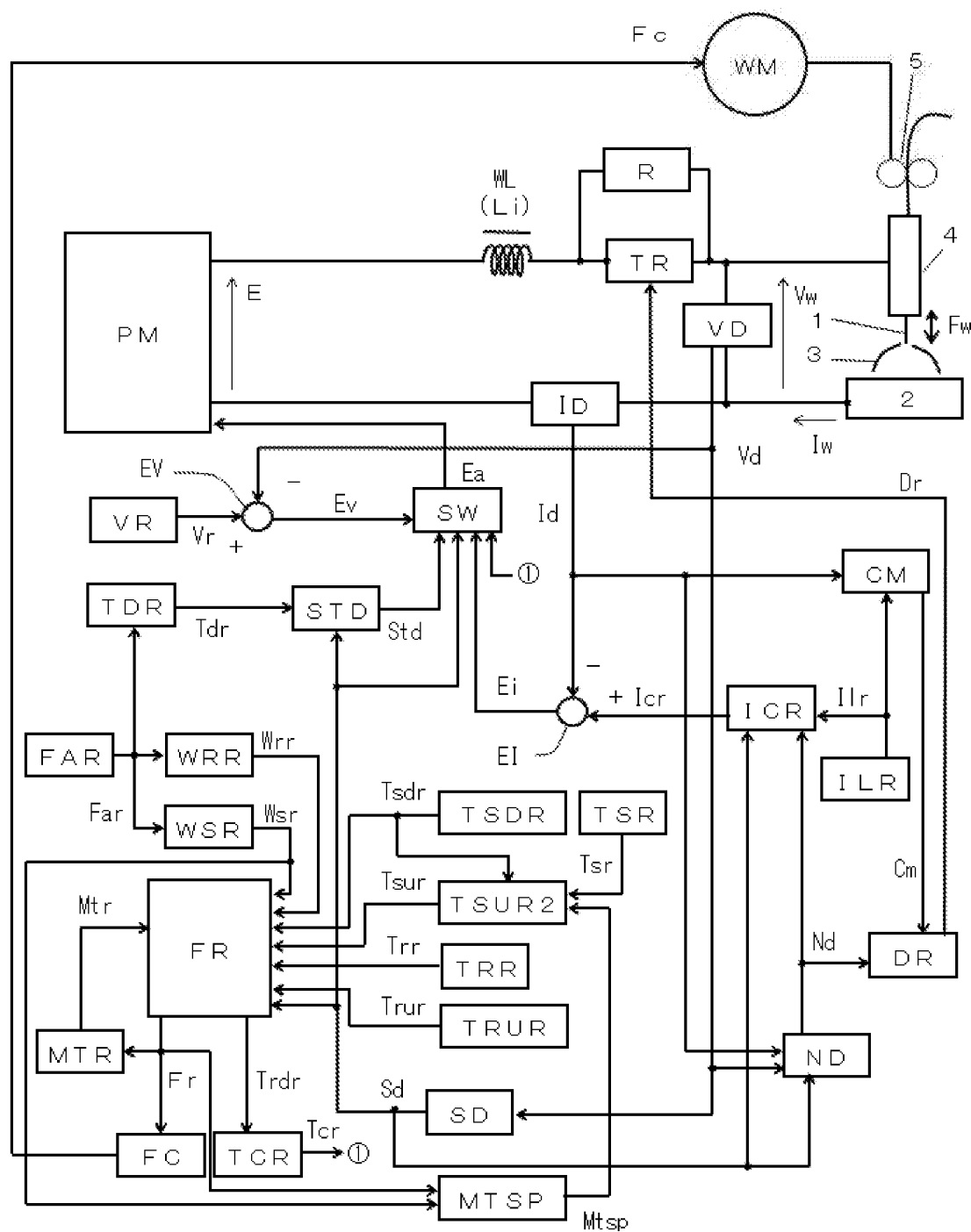
FIG. 3 is a block diagram of a welding power source for implementing an arc welding control method according to a second embodiment.

Referring now to FIG. 3, a second embodiment will be described below.

The second embodiment may have the same or substantially the same features as those explained above with the first embodiment (see FIGS. 1 and 3). Further, the second embodiment may include additional features as described below.

For instance, by the second embodiment, the time length of the forward feeding acceleration period Tsu may be controlled or adjusted in accordance with the time length of the arc period (t4-t7) in addition to the control of the reverse feeding deceleration period Trd.

FIG. 3 is a block diagram of a welding power source for implementing an arc welding control method according to the second embodiment. FIG. 3 illustrates a variation of the configuration depicted in FIG. 1, with the same reference signs being given to blocks that are the same as or similar to those of FIG. 1, and description thereof will not be repeated. As seen from FIG. 3, a forward feeding peak period measurement circuit MTSP and a forward feeding period setting circuit TSR are added to the system of FIG. 1, and the forward feeding acceleration period setting circuit TSUR in FIG. 1 is replaced by a second forward feeding acceleration period setting circuit TSUR2.

The forward feeding period setting circuit TSR outputs a forward feeding period setting signal Tsr.

The forward feeding peak period measurement circuit MTSP receives the forward feeding peak value setting signal Wsr and the feeding speed setting signal Fr as inputs, measures the time length of the forward feeding peak period whereby the feeding speed setting signal Fr becomes equal to Wsr, and outputs a forward feeding peak period measurement signal Mtsp.

The second forward feeding acceleration period setting circuit TSUR2 receives the forward feeding deceleration period setting signal Tsdr, the forward feeding period setting signal Tsr and the forward feeding peak period measurement signal Mtsp as inputs, calculates and outputs a forward feeding acceleration period setting signal Tsur that is equal to Tsr-Tsdr-Mtsp. With such configurations, control is performed with respect to the time length of the forward feeding acceleration period so that the time length of the forward feeding period is equal to the value of the forward feeding period setting signal Tsr.

The timing chart of the signals of the welding power source in FIG. 3 is the same as FIG. 2 described above, except that the operations to be performed for the forward feeding acceleration period Tsu (t5-t6) may differ. Specifically, the forward feeding peak period measurement circuit MTSP in FIG. 3 measures the time length of the forward feeding peak period Tsp. At t5, while the value of the forward feeding period measurement signal Mtsp is equal to the time length of the forward feeding peak period Tsp of the previous cycle, a forward feeding acceleration period setting signal Tsur is calculated by subtracting the forward feeding peak period measurement signal Mtsp and the forward feeding deceleration period setting signal Tsdr from the value of the forward feeding period setting signal Tsr in FIG. 3. Then, the welding shifts to the calculated forward feeding acceleration period Tsu (t5-t6). During the forward feeding acceleration period Tsu, the feeding speed Fw increases from 0 to the forward feeding peak value Wsp, as shown in (A) of FIG. 2, while the arc period is continuing. The forward feeding acceleration period Tsu may be in a range of 0.5 to 2 ms, for example.

Advantages of the second embodiment are as follows. According to the second embodiment, in addition to the above-noted features of the first embodiment, the time length of the forward feeding acceleration period is controlled in accordance with the time length of the arc period. As a result, the following advantages can also be enjoyed.

(1) When the arc period becomes longer due to a disturbance, control is performed so that the forward feeding acceleration period of the next cycle will be shorter than otherwise. During the forward feeding acceleration period, the welding wire is forward fed with an arc being generated, and thus the arc length becomes shorter. Then, by making the forward feeding acceleration period shortened, the length of the arc can be rapidly decreased, whereby a short circuit will occur earlier and the arc period becomes shorter. Accordingly, the respective cycles of short circuit/arc periods repeatedly conducted can be stabilized (e.g., equalized), and the resulting welding conditions are prevented from suffering undesired quality variation, for example.

(2) When the arc period becomes shorter due to a disturbance, control is performed so that the forward feeding acceleration period of the next cycle will be longer than otherwise. By making the forward feeding acceleration period longer, it takes a certain time for the arc length to become shorter. Thus, a short circuit will occur later and the arc period will be longer. Accordingly, the respective cycles of short circuit/arc periods repeatedly conducted can be stabilized (e.g., equalized), and the resulting welding conditions are prevented from suffering undesired quality variation, for example.

Further, in the second embodiment, the time length of the forward feeding acceleration period may be controlled or adjusted so that the forward feeding period will become a predetermined value. In this case too, the forward feeding acceleration period becomes shorter when the arc period becomes longer, while the forward feeding acceleration period becomes longer when the arc period becomes shorter. By adopting such configurations, control of the forward feeding acceleration period is simplified (while enjoying the above-noted advantage), and the stability of the control system improves.

The invention claimed is:

1. A method of controlling arc welding with a forward feeding period and a reverse feeding period that are alternately switched, wherein a welding wire is fed toward an object to be welded during the forward feeding period and the welding wire is fed away from the object during the reverse feeding period, the method comprising:
   repeating a set of a short circuit period and an arc period, wherein the welding wire and the object are short-circuited during the short circuit period, and an arc is generated between the welding wire and the object during the arc period;
   controlling the arc welding such that the reverse feeding period shifts to the forward feeding period when an arc occurs during the reverse feeding period; and
   controlling the arc welding such that the forward feeding period shifts to the reverse feeding period when a short circuit occurs between the welding wire and the object during the forward feeding period,
   wherein the reverse feeding period comprises a reverse feeding deceleration period having a time length, and adjusting the time length of the reverse feeding deceleration period in accordance with a time length of the short circuit period; and
   adjusting the time length of the reverse feeding deceleration period such that a time length of the reverse feeding period is equal to a predetermined reverse period value.

2. The method according to claim 1, wherein the forward feeding period comprises a forward feeding acceleration period having a time length, and adjusting the time length of the forward feeding acceleration period in accordance with a time length of the arc period.

3. A method of controlling arc welding with a forward feeding period and a reverse feeding period that are alternately switched, wherein a welding wire is fed toward an object to be welded during the forward feeding period and the welding wire is fed away from the object during the reverse feeding period, the method comprising:
   repeating a set of a short circuit period and an arc period, wherein the welding wire and the object are short-circuited during the short circuit period, and an arc is generated between the welding wire and the object during the arc period;
   controlling the arc welding such that the reverse feeding period shifts to the forward feeding period when an arc occurs during the reverse feeding period; and
   controlling the arc welding such that the forward feeding period shifts to the reverse feeding period when a short circuit occurs between the welding wire and the object during the forward feeding period,
   wherein the reverse feeding period comprises a reverse feeding deceleration period having a time length, and adjusting the time length of the reverse feeding deceleration period in accordance with a time length of the short circuit period; and
   further comprising increasing a welding current upon elapsing of a delay time period starting at a time that the arc period begins, and controlling the delay time period to vary in accordance with the time length of the reverse feeding deceleration period.

4. A method of controlling arc welding with a forward feeding period and a reverse feeding period that are alternately switched, wherein a welding wire is fed toward an object to be welded during the forward feeding period and the welding wire is fed away from the object during the reverse feeding period, the method comprising:
   repeating a set of a short circuit period and an arc period, wherein the welding wire and the object are short-circuited during the short circuit period, and an arc is generated between the welding wire and the object during the arc period;
   controlling the arc welding such that the reverse feeding period shifts to the forward feeding period when an arc occurs during the reverse feeding period; and
   controlling the arc welding such that the forward feeding period shifts to the reverse feeding period when a short circuit occurs between the welding wire and the object during the forward feeding period,
   wherein the reverse feeding period comprises a reverse feeding deceleration period having a time length, and adjusting the time length of the reverse feeding deceleration period in accordance with a time length of the short circuit period;
   wherein the forward feeding period comprises a forward feeding acceleration period having a time length, and adjusting the time length of the forward feeding acceleration period in accordance with a time length of the arc period; and
   adjusting the time length of the forward feeding acceleration period such that a time length of the forward feeding period is equal to a predetermined forward period value.

* * * * *